United States Patent Office 3,357,930
Patented Dec. 12, 1967

3,357,930
ELECTRICALLY CONDUCTIVE TRANSPARENT MATERIALS
Alvin M. Marks and Mortimer M. Marks, both of 153—16 10th Ave., Whitestone, N.Y. 11357
No Drawing. Filed Dec. 9, 1963, Ser. No. 329,229
3 Claims. (Cl. 252—518)

This invention relates to electrically conductive coatings and particularly to coatings which have a high degree of transparency and low electrical resistance.

This application is in part a continuation of our application entitled "Electrically Conductive Transparent Materials," Ser. No. 70,380, filed Nov. 21, 1960, now abandoned.

In controlling the light coming from television displays, radar displays, variable density filters and the like, it is often necessary to use one or more transparent, electrically conductive layers or coatings between the light source and the viewer. Presently known transparent, electrically conductive coatings such as stannic oxide films, however, absorb substantial amounts of the light passing therethrough.

Compositions have heretofore been proposed, which were designed to have a degree of electrical conductivity sufficient for the purpose of dissipating static electrical charges from a molded plastic article or the like. Dissipation of static is desirable in order to avoid the pickup and retention of dust, lint and other airborne debris on the surface of the molded article. Most of such compositions involved the incorporation of antistatic materials into the plastic composition in order to render it somewhat electrically conductive. In general, this approach met with limited success because the addition of sufficient destaticizing material to bring about the desired result tended to impair the physical properties of the plastic. In order to overcome this disadvantage, it has been proposed to employ the electrically-conducting or destaticizing material in the form of a coating on an inert, insoluble carrier. The carrier served as an extender, causing more efficient utilization of the destaticizing material, so that smaller amounts of it could be employed, and the deleterious effects of the destaticizing material thereby minimized. Such expedients, however, would be useless in accomplishing the objects of the present invention, because the presence of substantial amounts of insoluble inert carrier renders the product turbid, if not opaque, and might also contribute a coloration, depending on the carrier used. In some cases, it is possible to achieve a moderately translucent product using such extenders, but a clear, transparent product is inherently impossible.

Moreover, such compositions are in general not designed as film-forming compositions. Their principal use is for the production of solid molded objects, and further modification would be required to make them suitable as film-forming materials.

Accordingly, it is an object of the present invention to provide a transparent conductive coating which is perfectly colorless or non light absorbing.

Another object of the present invention is to provide a transparent conductive coating which has low resistivity.

An object of the present invention is to provide a transparent conductive coating which will withstand the repeated application of electrical potential.

A further object of the present invention is to provide a transparent conductive coating which will operate in a very humid atmosphere.

We have discovered that a colorless, non-light absorbing transparent conductive coating may be prepared by the use of certain ionizable electrolytic materials in transparent, plasticized, ionizable solvent containing polymeric film-forming materials, as hereinafter more fully described and claimed.

A feature of the present invention is the use as a principal film-forming material, of a polymeric matrix having an electrolyte dissolved therein.

Another feature is the use of a plasticizer capable of dissolving an ionizable electrolyte or which is itself an ionizable electrolyte.

Another feature of the present invention is the use of components such that the film will retain at equilibrium with the atmosphere, under normal conditions of use, sufficient moisture to maintain the ionizable electrolyte in the ionized state.

In one particularly desirable aspect, this invention contemplates a transparent, electrically conductive film comprising in combination:

(a) A polymeric matrix in gel form,
(b) A plasticizer for said polymer,
(c) An electrolyte soluble in said plasticizer and present in said film in the ionized state,
(d) An ionizable solvent in amount between about 5 and 25%.

In another particularly desirable aspect, this invention contemplates a film-forming composition comprising:

(a) A film-forming, hydroxyl containing polymer,
(b) A plasticizer for said polymer,
(c) An electrolyte soluble in said plasticizer,
(d) A solvent for said polymer, said solvent being miscible with said plasticizer and present in amount to maintain said composition in liquid form, said polymer, said plasticizer and said electrolyte having a combined solvent-binding capacity to retain from 5 to 25% solvent at equilibrium with the atmosphere in a film cast from said composition.

The polymeric materials useful in the practice of this invention include a wide variety of polymers which are transparent, or nearly so, in thin films. By the term thin films, we understand generally films of the order of 0.0001 to 0.01 inch thickness. Aside from transparency, the polymer should be castable in the form of a gel, as opposed to a hard, highly cross-linked film, so as to allow ionic mobility, and its usefulness as a film should not be effected by the continued solvent, for example, water in the amounts required to effect ionization of the electrolyte.

Among the polymers particularly preferred in the practice of this invention may be mentioned those which are polymers of hydroxyl-containing monomers, esters, or acetals. Examples of such polymers include polyvinyl alcohol, agar, carboxymethylcellulose, polyvinyl acetate, polyvinyl acetate-alcohol copolymers, polyvinyl acetal, polyvinyl formal, acrylic resins such as polymethyl methacrylate, polyethyl acrylate, etc. It should be noted that in describing the polymers as those of named monomers, it is not implied that they are necessarily made by actual polymerization of such monomers. Thus, for example, polyvinyl alcohol may be described as a polymer of monomeric vinyl alcohol, but is invariably produced by indirect means, as vinyl alcohol is non-existent in fact.

Other polymers fulfilling the above enumerated requirements may of course be used, as will be apparent to those skilled in the art.

The plasticizer employed will depend in part upon the particular polymer selected, and suitable plasticizers for all of the above-named polymers are well known to the art. Besides being effective to plasticize the polymer used, the plastisizer should, like the polymer, be transparent and colorless, or nearly so, when incorporated into thin films, and should be insensitive to the presence of moderate amounts of moisture in the film. Also the plasticizer should either itself be, or should be capable of retaining in solution, a suitable ionizable electrolyte.

Many suitable plasticizers for the above polymers are known to the art and are readily available. Among those particularly preferred for use in the present invention are glycols such as ethylene glycol, diethylene glycol, propylene glycols and the like, polyglycols, such as tri- or tetra glycol (triethylene and tetraethylene glycol), etc., and polyhydric alcohols such as glycerin, iso-erythritol and the like. Of those materials capable of functioning both as plasticizer and as electrolyte, we particularly prefer phosphoric acid, $H_3PO_4$, acid more particularly to its polymeric form, polyphosphoric acid.

With respect to the electrolyte, a wide choice exists. The electrolyte may be an acid, a base or a salt. It must, of course, be one that is unreactive toward the other components of he film, and preferably should be one that is not highly volatile (for example HCl or $NH_4OH$), to prevent its being lost through evaporation. This requirement may be overlooked, however, when the film is to be protected against such evaporative loss by lamination between glass plates or the like. The electrolyte must also be soluble in the plasticizer, in order to make it compatible with the other components of the film. Preferably the electrolyte should be highly soluble in the plasticizer so that ample quantities of electrolyte can be incorporated without incurring the danger that the electrolyte will be precipitated out in case the film is occasionally subjected to low temperatures. Moreover, the electrolyte should preferably be highly ionizable, in order to provide ample current-carrying capacity without requiring excessive loadings of electrolyte in the composition. This requirement is somewhat interdependent with the solubility requirement, however, and electrolytes having lower dissociation constants may be employed, for example, where the solubility is such that high loadings of electrolyte are permissable. Among the electrolytes suitable for the practice of this invention may be mentioned acids, such as phosphoric acid (either as plasticizer or dissolved in another plasticizer), oxalic acid, etc. Also useful are salts, particularly the halides of the alkali metals, such as NaCl, LiCl, and in general the chlorides, bromides and iodides of sodium, potassium, lithium, rubidium and caesium, etc., as well as the corresponding ammonium salts. Among these, the chlorides are in most cases preferable to the bromides and iodides, for reasons of cost. For the same reason, the sodium, potassium and lithium salts, as well as the ammonium salts, are usually preferable to the rubidium and caesium salts. Other salts of the alkali metals and ammonia may be used for example, $Na_2SO_4$, $K_2SO_4$, $(NH_4)_2SO_4$, $Li_2SO_4$, as well as the corresponding carbonates, thiocyanates, dihydrogen phosphates, nitrates, oxalates, etc. Also, corresponding ionizable salts of other metals such as the alkaline earth metals and magnesium may be successfully employed, but are generally less advantageous because of their generally lower ionic mobilities.

Bases may also be employed as the electrolyte, subject to the same conditions as to non-reactivity with the other components of the film, solubility in the plasticizer, and ionizability. Among such bases we prefer NaOH, KOH, and LiOH.

In addition to the polymer, plasticizer and electrolyte, a fourth component is frequently, although not always required. This is a cross-linking agent to assist in the achievement of a gel form of film. The desired type of film is one that is sufficiently permeable to permit ionic mobility, and nevertheless is dry or only slightly tacky to the touch, and not flowable. In some cases, the desired gel condition can be achieved by proper selections. Where a cross-linking agent is desired or required, we prefer to use an additive such as polysilicic acid, which may be derived, for example, by the hydrolysis of a tetra alkyl silicate, which is capable of reacting with the polymer chain so as to give a degree of cross-linking without destroying the permeability of the cross-linked structure. Many other agents may be substituted for silica to achieve the same effect, as will be obvious to those skilled in the art. Among the preferred substitutes for silica are reactive polyacids or hydrous oxides of titanium, zirconium, germanium, niobium, tantalum, tin and similar polyvalent metals. Silica in the form of a soluable polysilicate or acid, is intended to be included in the expression "reactive polyacids and hydrous oxides of polyvalent metals" as used elsewhere herein.

In addition to providing a degree of cross-linking to the polymer itself, such agents also tend to gel the plasticizer by forming bridges between the hydroxyl groups of adjacent plasticizer molecules, and moreover tend to improve the physical stability of the film by forming bridges between polymer hydroxyl groups and plasticizer hydroxyl groups.

Although some of the plasticizers and plasticizer-polymer combinations are capable of acting as an electrolytic solvent, and are capable by themselves of effecting ionization of electrolytes dissolved therein, it is usually necessary to have moisture present in the composition in order to promote such ionization. It is not essential that the water be incorporated in the composition prior to casting it as a film. Provided the film as a whole (that is to say the polymer, plasticizer and dissolved electrolyte) is moderately hygroscopic, it will absorb and retain sufficient atmospheric moisture to effect the required ionization. The desired hygroscopicity may be contributed by the polymer, the plasticizer, or the electrolyte itself, or by a combination of two or more of these. Normally, the greatest contributing factor is the electrolyte. In general, it is preferred that the retained moisture in the film, at equilibrium with the atmosphere under normal conditions of use, be in the range 5 to 25% by weight based on the weight of the non-volatile components of the film (polymer, plasticizer, stabilizers and other solids if present). In general, the higher the moisture content, the lower the resistivity. By way of illustration, polyvinyl alcohol has appreciable hygroscopicity among the polymers, while glycerin among the plasticizers has a similar property. Among the electrolytes, many having varying degrees of hygroscopicity are well known to the art; lithium chloride, lithium and bromide, phosphoric acid may be mentioned as illustrative of highly hygroscopic electrolytes.

The amount of water in the film may be controlled by exposing the formed film to an atmosphere having a controlled humidity, until equilibrium is reached, and then laminating the film between glass plates or otherwise coating the film to prevent evaporation or further absorption of moisture.

When it is desired to use the film in environments where it is exposed to the atmosphere, the moisture content of the film may be stabilized by the use of electrolytes such as salts which form stable hydrates of definite composition.

For films that must operate in contact with very humid atmospheres, it is desirable to use polymers, plasticizers and electrolytes of relatively low hygroscopicity.

Combinations of salts which form inter-molecular compounds with plastics or plasticizers may also be used to advantage in preparing coating compositions according to the present invention. Among such compounds, formed by various inorganic salts with glycerin, may be mentioned $BaCl_2 \cdot 2H_2O \cdot 7C_3H_5(OH)_3$, $SrCl_2 \cdot 7C_3H_5(OH)_3$, $Sr(NO_3)_2 \cdot 8C_3H_5(OH)_3$, all of which are liquids, and low-melting solids such as $CaCl_2 \cdot 3C_3H_5(OH)_3$ and $Ca(NO_3)_2 \cdot 4C_3H_5(OH)_3$. The sulfates of copper, cobalt, nickel and zinc, for example, also form similar compounds with glycerin. The use of salts and plasticizers in proportions to form such inter-molecular compounds tends to provide films of enhanced stability.

With respect to the relative proportions of the various components in the compositions of the present invention, considerable freedom of choice is available, without departing from the spirit and scope of the invention. Nevertheless, certain precautions should be observed. The polymer should, in general, amount to between about 10 and about 65 percent of the composition. If less than 10% polymer is present, the amount tends to be insufficient to form a satisfactory strong and coherent film. Above 65%, the amount of polymer reaches proportions which tend to form hard, impervious, brittle films, rather than the somewhat permeable, well-plasticized, gel-type film desired.

The amount of plasticizer may vary rather widely, but in general should preferably be from about 25% to about 60% of the composition so as to render ions a high mobility. If the amount of plasticizer is too small, the film will not be highly permeable and ionic mobility will decrease, whereas if too much plasticizer is used, the product tends to be tacky or even a viscous liquid rather than the desired dry or nearly dry coating.

The amount of electrolyte employed will depend to some extent upon the degree of conductivity desired, and also to some extent on the properties of the particular electrolyte selected, those having smaller radii generally having greater mobility and contributing more to the conductivity of the film. As a general rule, however, it can be said that the amount of electrolyte should be in the range between 5% and 50% by weight of the composition, in order to provide a useful degree of conductivity without overloading the formulation with electrolyte. Too high a concentration of electrolyte leads to a danger of precipitation, resulting in loss of both transparency and conductivity. This danger is particularly present when the film is likely to be exposed to low temperatures. When such exposure is anticipated, therefore, it is preferable to keep the amount of electrolyte in the lower portion of the above range. For most general purposes, amounts in the range of 20–40% are preferred.

In some instances, as noted above, it is not necessary to use a cross-linking agent at all. If used, however, it may be present in very small amounts, or in amounts up to about 50% by weight of the composition, depending on the degree of cross-linking desired. Higher proportions of cross-linking agents cannot in general be used as the chain-like polymer, plasticizer and electrolyte must also be present. Moreover a substantial proportion of chain-like polymer must be present to give the composition the necessary gel structure and the cross-linking agent acts to tie this structure together. Moreover the inorganic cross-linking agents generally are present in polymeric form and as such constitutes more or less a permeable framework interspersed with the organic chain-like polymers.

Within the limits of composition defined by the above range, the compositions in general are clear mixtures of homogeneous appearance and are transparent and colorless.

An important property of the composition according to this invention is that all of the components are mutually compatible, so that all materials are either mutually soluble, or so finely dispersed that they are of colloidal dimensions (e.g. inclusions of liquid water or plasticizer within the solid matrix of the film, constituting a colloidal gel). If this condition is not met, the non-homogeneous character of the film results in a turbid or opaque appearance, rather than the clear, colorless appearance required for a useful film.

In dealing with simple polymer-plasticizer systems, the production of such clear, homogeneous-appearing films is a matter of conventional practice, and using any of the usual polymer-plasticizer compositions, clear films are produced, without any particular precautions being taken. Without oversimplifying too greatly, the process of film formation may be considered to be the formation of a solid but porous matrix of polymer, containing the liquid plasticizer in the interstices of the matrix, and held there by solvation, intermolecular attractions and the like.

In view of the fact that the film is formed from a solution in which both the polymer and the plasticizer is dissolved, it is to be expected that the plasticizers will be uniformly dispersed throughout the polymer matrix, and such is in fact the case. The plasticizer normally is present in such a fine state of subdivision that the individual droplets or particles thereof are of a size range not exceeding about half the average wavelength of visible light, and hence do not refract the light as it passes through them in traversing the film. The result is that the film has a clear, homogeneous appearance.

In the films of the present invention, the same considerations apply, and a clear transparent film is formed in the same way and for the same reasons. The difference, however, is that in the compositions of this invention the dispersed liquid phase consists not merely of conventional plasticizer, but of a plasticizer which either is itself an electrolyte, or contains an electrolyte dissolved in it, and which also contains a solvent such as water in sufficient amount to bring about dissociation of the electrolyte.

In order to preserve the degree of dispersion required for clarity, however, it is necessary to take certain precautions, chief among which is to be sure that the liquid phase remains a single-phase liquid, i.e. care should be taken to avoid any possibility that the electrolyte, or the moisture, will be present in amount exceeding its solubility in the plasticizer. For the same reason, the inclusion of any other materials insoluble in the plasticizer should also be avoided.

Where a cross-linking agent such as silica, titania or the like is employed, such material becomes part of the polymer matrix, and its presence does not affect the composition or state of dispersion of the disperse liquid (plasticizer) phase. It should be observed however, that such a cross-linking agent should not be used in amounts exceeding availability of atoms to react with it, nor should it be used in an unreactive form (such as dried silica gel) which will prevent its becoming fully incorporated into the structure of the polymer matrix. Due account should obviously also be taken of the moisture content of such materials, as this moisture is liberated in the course of the cross-linking reaction and contributes pro tanto to the moisture content of the liquid phase.

In view of the foregoing discussion, it will be apparent that, in addition to the limitations previously set forth on the permissable proportions of ingredients, the electrolyte and the ionizable solvents such as water should be present in amounts not exceeding their respective solubilities in the plasticizer, and the cross-linking agent (if any) should be present in amounts not exceeding the quantity of hydroxyl or other reactive groups available to react with it.

WATER CONTENT

The various percentages and proportions given above are based on the non-volatile components of the film, i.e. the polymer, plasticizer, electrolyte and cross-linking agent, if any is used. In addition, in order for the film to function properly, it is usually necessary for it to contain a proportion of water sufficient to bring about the ionization of the electrolyte. Normally, as noted above, the amount of water should be in the range 5–25% by weight based on the non-volatiles in the film. Lesser amounts of water tend to be ineffective to cause the desired degree of ionization, while amounts in excess of 25% are difficult to incorporate without deleteriously affecting the physical properties of the film.

Conventional heat and light stabilizers may of course be incorporated into the film-forming compositions of this invention, as will be obvious to those skilled in the art. Also the film-forming compositions may, and if not to be used immediately will, be thinned down with suitable solvents and thinners to increase ease of application and lengthen shelf life by inhibiting premature gelation. Such solvents and thinners are well known to the art and include all of the common ether, ester, ketone and hydrocarbon solvents, as well as conventional thinners such as alcohols, petroleum hydrocarbons and the like.

The film-forming compositions according to this invention and films made therefrom may be applied and used in various ways. For example, the film-forming composition may be applied as a thin, uniform layer to each of two glass plates, as by centrifuging or other known means, the coatings dried, and the sheets laminated together (with the coated sides facing each other) by known methods under mild temperatures of up to about 70 C. and pressures of the order of 20 lbs. per square inch. Lamination between glass plates in this manner preserves the composition of the film against changes that might be brought about by exposure to the atmosphere. Where the film is such that it is not harmed by such exposure, it may be applied to a single glass panel or other appropriate substrate, either by spin-coating, dipping, painting on, application with a doctor blade, or in various other ways well known to the art. The composition may be applied as an uncut mixture of the non-volatile components, or as a solution of the non-volatiles in a suitable solvent, followed by evaporation of the solvent.

In order to illustrate more fully the nature of this invention and the manner of practicing the same, the following examples are presented.

Example 1

A coating composition is prepared containing 25% solids, the solids consisting of 65% by weight of polyvinyl formal (Formvar 12/85), and 35% of phosphoric acid, $H_3PO_4$. The resulting composition is coated on the surfaces of two glass sheets, by centrifuging, to a thickness of 0.001 inch. The coated sides of the two sheets are thereafter placed together with a thin coating of phosphoric acid between them, and pressed together for four hours at 70° C. under pressure of ten pounds per square inch.

Thin metal foil bus bars are applied to opposite edges of the resulting laminate. The resistance of the laminate, measured between the bus bars, is approximately 12,000 ohms per square.

Example 2

A coating composition is prepared by mixing the following materials:

| | Parts by weight |
|---|---|
| Solid polyvinyl alcohol | 30 |
| Glycerine | 48 |
| Lithium chloride | 14 |
| Silica (added as a hydrolized tetra alkyl silicate or a polysilicic acid solution in alcohol-water, and calculated as $SiO_2$) | 8 |

The above composition, when cast on a suitable support as a film of about 0.001 inch thickness, forms a clear, transparent, colorless coating having an electrical resistivity of the order of 10,000 ohms per square. Thicker films have lower resistivities, depending inversely on the thickness of the coating.

In the basic composition just described, the following substitutions may be made subject to some variation to take account of solubility differences on a weight for weight basis:

For lithium chloride, substitute

Sodium chloride
    Potassium chloride
    Ammonium chloride
    Rubidium chloride
    Caesium chloride or the corresponding bromides, chlorides, iodides, thiocyanates, dihydrogen phosphates, nitrates, oxalates or hydroxides, or phosphoric or oxalic acid.

For polyvinyl alcohol, substitute agar, carboxymethylcellulose, polyvinyl acetate, polyvinyl acetate-alcohol copolymer, polyvinyl acetal, polyvinyl butyral, polyvinyl formal, polymethyl methacrylate or polyethyl acrylate.

For glycerine, substitute glycol, diethylene glycol, triethylene glycol, phosphoric acid, or iso-erythritol.

For silica, substitute titania, zirconia, germania, niobia, tantalia or stannia.

Films cast from compositions made according to this example, either in the basic form first described or using the various substitutions above enumerated, in general retain between about 5 and about 25% moisture (based on the weight of non-volatile components) at equilibrium with the atmosphere under normal conditions of use.

Example 3

A polyvinyl alcohol solution is prepared by adding 15 parts by weight of powdered polyvinyl alcohol to a mixture of 70 parts of n-propanol and 15 parts of distilled water.

A hydrolyzed ethyl silicate solution is prepared by adding 7.5 parts of 1% aqueous HCl solution to 42.5 parts of tetraethyl orthosilicate and agitating violently for about 5–10 minutes until a clear solution is formed. The solution is maintained at 60° C. for one hour to improve its shelf life. The resulting solution is an inorganic silicate polymer dissolved in ethyl alcohol in a concentration of about 24.6%.

A film-forming composition is prepared by combining 30 parts by weight of the polyvinyl alcohol solution prepared as above, containing 4.5 parts of polyvinyl alcohol, with 48.0 parts of glycerin, 14.0 parts of solid lithium chloride and hydrolyzed ethyl silicate solution prepared as above in amount to contain 2.0 parts by weight of solids.

A film prepared from this film-forming composition is clear, colorless, and has a resistively of about 12 ohms/cm.

The film-forming compositions and the films of this invention provide the means whereby a transparent substrate may be provided with a transparent, electrically conductive surface layer. If desired, the film may be stripped from the substrate or prepared on rolls or the like, after the manner of making cellophane and similar films, to provide a self-supporting, transparent, electrically conductive film. The film is colorless and absorbs little light, and possesses very low electrical resistivity, as compared with existing materials. The films will withstand repeated application of electrical potentials without serious change in their electrical, optical or physical properties.

While this invention has been described with reference to certain preferred embodiments and described by way of specific examples, these are illustrative only, and the invention is not to be construed as limited, except as set forth in the appended claims.

Having thus fully described the invention, what is claimed as new and desired to be secured by Letters Patent of the United States is:

1. A transparent, electrically conductive film composition consisting essentially of:
  (a) 10–65% by weight of a polymer selected from the group consisting of polyvinyl alcohol, agar, carboxymethylcellose, polyvinyl acetal, polyvinyl acetate, polyvinyl butyral, polyvinyl formal, polymethyl methacrylate and polyethyl acrylate,
  (b) 25–60% by weight of a plasticizer dissolved in said polymer selected from the group consisting of glycerine, ethylene glycol, diethylene glycol, triethylene glycol, phosphoric acid and iso-erythritol,
  (c) 5–50% by weight of an ionizable compound material selected from the group consisting of phosphoric acid, oxalic acid, the halides, sulfates, carbonates, thiocyanates, dihydrogen phosphates, nitrates and oxalates of the alkali metals, ammonia, the alkaline earth metals, magnesium, the hydroxides of sodium, potassium and lithium, (d) up to 50% by weight of a cross-linking agent for said polymer,
(e) 5–25% by weight of a solvent,
said percentages being based on the total weight of the composition.

2. A transparent, electrically conductive film consisting essentially of:
(a) Polyvinyl alcohol in amount from about 10 to about 65%,
(b) Gylcerine in amount from about 25 to about 60%,
(c) Lithium chloride in amount from about 5 to about 50%,
(d) Polysilicic acid in amount to contain silica, $SiO_2$, up to about 50%, and
(e) Water in amount from about 5 to about 25%,
all of said percentages being by weight, based on the total weight of said polyvinyl alcohol glycerine, lithium chloride and polysilicic acid.

3. A film-forming composition consisting essentially of:
(a) Polyvinyl alcohol in amount from about 10 to about 65%,
(b) Gylcerine in amount from about 25 to about 60%,
(c) Lithium chloride in amount from about 5 to about 50%, and
(d) Polysilicic acid in amount to contain silica, $SiO_2$, up to 50%,
all of said percentages being by weight, based on the total weight of said polyvinyl alcohol, glycerine, lithium chloride and polysilicic acid, and
(e) A solvent in amount to maintain said composition in the liquid state.

References Cited
UNITED STATES PATENTS

| | | | |
|---|---|---|---|
| 2,687,395 | 8/1954 | Marks | 252—518 |
| 2,977,514 | 3/1961 | Myers et al. | 252—62.2 X |
| 2,993,022 | 7/1961 | Coler | 252—500 X |
| 3,111,497 | 11/1963 | Hass | 260—41 BX |

OTHER REFERENCES

Durrans, Solvents, C. Van Nostrand Co. (1950), TP 247.5 D965, pp. 226–232.

LEON D. ROSDOL, *Primary Examiner.*

JULIUS GREENWALD, *Examiner.*

J. D. WELSH, *Assistant Examiner.*